United States Patent [19]

Wallenfang et al.

[11] Patent Number: 4,576,129

[45] Date of Patent: Mar. 18, 1986

[54] FUEL INJECTION SYSTEM FOR INTERNAL COMBUSTION ENGINES

[75] Inventors: Gerd Wallenfang, Cologne; Manfred Glöckner, Pulheim, both of Fed. Rep. of Germany

[73] Assignee: Klöckner-Humboldt-Deutz Aktiengesellschaft, Cologne, Fed. Rep. of Germany

[21] Appl. No.: 573,802

[22] Filed: Jan. 25, 1984

[30] Foreign Application Priority Data

Jan. 25, 1983 [DE] Fed. Rep. of Germany ....... 3302293

[51] Int. Cl.[4] ............................................ F02M 39/00
[52] U.S. Cl. ................................... 123/357; 123/494; 123/486; 73/119 A; 239/585
[58] Field of Search ............... 123/357, 358, 359, 458, 123/494, 486, 500, 501; 73/119 A; 239/585

[56] References Cited

U.S. PATENT DOCUMENTS

| | | | |
|---|---|---|---|
| 4,033,310 | 7/1977 | Nicolls | 123/501 |
| 4,319,327 | 3/1982 | Higashiyama | 123/486 |
| 4,327,695 | 5/1982 | Schechter | 123/500 |
| 4,335,695 | 6/1982 | Phipps | 123/357 |
| 4,359,032 | 11/1982 | Ohie | 123/486 |
| 4,364,351 | 12/1982 | Romblom | 123/357 |
| 4,388,908 | 6/1983 | Babitzka | 123/500 |
| 4,397,282 | 8/1983 | Salway | 123/486 |
| 4,459,670 | 7/1984 | Yamaguchi | 123/486 |

Primary Examiner—Carl Stuart Miller
Attorney, Agent, or Firm—Becker & Becker, Inc.

[57] ABSTRACT

A fuel injection system, especially for air-compressing, spontaneous ignition reciprocating piston internal combustion engines. At least one parameter which characterizes the injection process, such as beginning and duration of the injection, is adapted to be regulated by at least one electromagnetic control valve per cylinder unit which can be controlled by an electrically operating data processor as a function of characteristic operating parameters of the internal combustion engine. In order to compensate for transmission deviations of the electromagnetic control valves caused by wear and operation, the control pulses of the data processor are transmitted to each electromagnetic control valve via a suitable circuit in such a way that the control valve opens and/or closes with a constant time delay during each control procedure. The constant time delay of the control valve can be established as a function of the actual speed of the internal combustion engine. The control time point of the control valve, as determined by the data processor, for opening and/or closing the control valve can be varied as a function of the constant time delay thereof.

24 Claims, 10 Drawing Figures

| $U_{REF}$ | $U_{REP}$ | A | B | J |
|---|---|---|---|---|
| L | L | H | H | + |
| H | H | L | L | − |
| H | L | H | L | 0 |
| L | H | H | L | 0 |

Fig. 6

FUEL INJECTION SYSTEM FOR INTERNAL COMBUSTION ENGINES

BACKGROUND OF THE INVENTION

1. Field of the Invention

The present invention relates to a fuel injection system for air-compressing, spontaneous ignition, reciprocating piston internal combustion engines which have a fuel injection pump and an injection nozzle for each cylinder unit. At least one parameter characteristic of the injection process, such as beginning of injection, end of injection, and duration of injection, is adapted to be regulated by at least one electromagnetic control valve per cylinder unit. Each control valve preferably controls a low-pressure line, especially a discharge line, which is provided on the high-pressure side of the fuel injection pump. Each control valve can be controlled by an electrically operating data processor by means of a control pulse as a function of characteristic operating parameters of the internal combustion engine. If necessary or desired, a further mechanically operated adjustment member can be provided for controlling the fuel injection system.

2. Description of the Prior Art

A fuel injection system of the aforementioned general type having an electromagnetic control valve and a data processor is known from German Offenlegungsschrift No. 20 26 665. In this system, each cylinder unit is provided with an electromagnetic control valve which controls a discharge line on the pressure side of the fuel injection pump. The discharge line can be opened by the control valve, especially to regulate the end of injection of the fuel injection system. In order with such a system to be able to compensate for deviations of the transmission characteristics of the electromagnetic control valves as caused by wear and operation, German Offenlegungsschrift No. 20 26 665 proposes determining the actual value control times of a single electromagnetic control valve, and controlling the remaining electromagnetic control valves while taking into consideration the comparison of the actual value control times of this first electromagnetic control valve and the desired value control times of the electrically operating data processor. However, since the transmission characteristics of the electromagnetic control valves can vary greatly due to the specific formation of wear, deviations of all of the electromagnetic control valves of the cylinder units of the internal combustion engine can be only very unsatisfactorily compensated for with such a system, so that a satisfactory operation of an air-compressing, spontaneous ignition, reciprocating piston internal combustion engine having such a fuel injection system is not possible, especially with a view toward the very high fuel injection pressures which are continuously being aimed for, and the correspondingly very short durations of injection.

An object of the present invention therefore is to improve a fuel injection system of the aforementioned general type in such a way that deviations of the transmission characteristics of the electromagnetic control valves of the system can be compensated for, and the control time points of the electromagnetic control valves determined by the electrically operated data processor can be precisely and accurately set.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The fuel injection system of the present invention is characterized primarily in that associated with each electromagnetic control valve is a delaying device which, while taking into account the transmission characteristics associated with the control valves, transmits the control pulse of the data processor to the elecromagnetic control valve in such a way that the control valve opens and/or closes with a constant time delay during each control procedure; the constant time delay of the control valve can be established as a function of the actual speed of the internal combustion engine, and the control time point of the control valve, as determined by the data processor for opening and/or closing, can be varied as a function of the constant time delay of the control valve.

These features make it possible to compensate in an advantageous manner for deviations or different transmission characteristics of the electromagnetic control valves in a simple manner and independently of one another. The constant time delay is provided in an advantageous manner in such a way that the magnetic, electrical, and mechanical effects of errors on the transmission characteristics of the electromagnetic control valves are extensively taken into account, so that there is possible in an advantageous manner, via a suitable circuit, to adapt the transmission characteristic of each of the electromagnetic control valves to the constant delay, and to determine the constant time delay with a central electrical device as a function of the speed of the internal combustion engine and to take this time delay into account during control of the electromagnetic control valve via the electrically operating data processor. The delaying device preferably includes a first delay element having a constant time delay, a second delay element having a variable time delay, a circuit breaker, a device for recognizing the armature travel of the control valve with a processor, and a phase disciminator. In many applications, a constant time delay of the first delay element of 2.56 ms has proven sufficient. A further advantage thereof is that the constant time delay of 2.56 ms can be realized in a simple manner with electrical components. The adaptation of the transmission characteristics associated with the valve to the constant time delay is preferably effected via the phase discriminator, which compares the actual value delivered by the device for recognizing the armature travel of the control valve with the desired value delivered by the data processor and delayed in a constant manner by the first delay element, and preferably regulates the second delay element by means of a corrective control value in such a way that the desired value and the actual value concide at the phase discriminator.

Further advantageous specific embodiments of the present invention, especially for establishing the constant time delay as a function of the speed of the internal combustion engine, and the details of the circuit for changing the control time point of the electromagnetic control valve for opening and/or closing the same, are as follows. For example, the control pulse of the data processor may be adapted to be conveyed to the first and second delay elements. The control valve may be controllable by the second delay element. The device for detecting the armature travel of the control valve may deliver an actual value to the phase discriminator, and the first delay element may deliver a desired value to the phase discriminator, which as a function of the desired value-actual value comparison generates a control value which regulates the second delay element. The phase discriminator may generate such a control value that a coincident desired value and actual value exist at the phase discriminator.

A component of the internal combustion engine which is directly dependent upon the actual speed thereof may be provided with pick-up elements which generate a series of pulses in a sensor. These pulses are dependent upon the actual speed of the internal combustion engine, and can be transmitted to a first counter and a second counter. The pick-up elements may be provided on the crank shaft or on the flywheel of the internal combustion engine. The pulses generated in the sensor may be converted in the first and second counters into a process variable which characterizes the actual speed of the internal combustion engine. The pick-up elements may be disposed on the flywheel or the crank shaft at 1° intervals. The pulses generated by the pick-up elements in the sensor may be conveyed to the first and second counters via a frequency multiplier.

A switch position may be provided for switching the first counter on and off. The switch position may be controllable by a timer as a function of the constant time delay of the first delay element.

The first and second counters can be connected. The process variable determined by the first counter may be stored in a memory. The first counter can be set to a desired value for the beginning of injection as determined by the electrically operating data processor, whereby the desired value and the process variable determined by the first counter are added together and the sum can be transmitted into the memory of the first counter.

The second counter continuously may determine counting intervals which are limited by a fixed predetermined maximum value. A synchronous pulse pick-up element may be provided on the flywheel or on the crank shaft, and may generate a synchronous pulse which characterizes the beginning of the power stroke of the internal combustion engine. The second counter may be connectable with the memory of the first counter, whereby the second counter can be set to the content of the memory via the synchronous pulse. The fixed predetermined maximum value of the counting intervals of the second counter may be correlated with the ignition period or angle of that cylinder unit of the internal combustion engine which, in the ignition sequence, follows the synchronous pulse.

A comparator may be provided which compares the content of the memory and each of the process variables determined by the first counter, and corrects the memory content and the second counter as a function of the results of the comparison, whereby the correction is effected between two counting pulses of the second counter.

The switch position may be controlled by the timer at half of the constant time delay of the first delay element, with the control pulses for the first counter being multiplied by 20 times by the frequency multiplier, and the control pulses for the second counter being multiplied 10 times. When the second counter reaches the fixed predetermined maximum value of each counting interval, there is generated a control pulse for the beginning of injection; this pulse can be conveyed to the first and second delay elements.

A third counter may be provided to which is applied the output signal of the frequency multiplier for the second counter. The third counter is adapted to be actuated by the control pulse of the second counter generated when the maximum value is reached. A comparator may be provided which can be set to a desired value for the duration of injection as determined by the electrically operating data processor, and which can be connected with the third counter when the latter is actuated; when the counting value determined by the third counter, and the intended value for the duration of injection, are achieved, the comparator generates a control pulse for the end of injection; this control pulse can be conveyed to the first and second delay elements.

DESCRIPTION OF PREFERRED EMBODIMENTS

Figure 1:
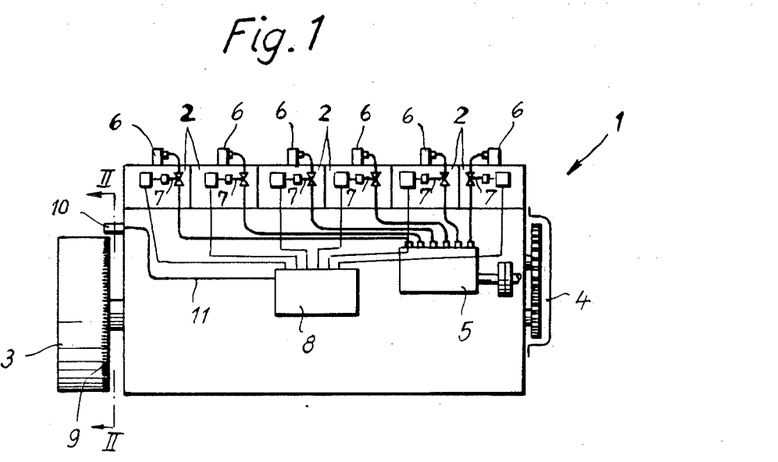
FIG. 1 is a schematic side view of a reciprocating piston internal combustion engine which is provided with the inventive fuel injection system.

Referring now to the drawings in detail, FIG. 1 schematically illustrates an air-compressing, spontaneous-ignition, reciprocating piston internal combustion engine 1; only those parts necessary for an immediate understanding of the present invention are illustrated in any detail. The internal combustion engine 1 has six in-line cylinders 2, a flywheel 3, a gear box 4, and an injection pump 5 in unit construction. Although not shown in detail, the driving side of the injection pump 5 is connected in a known manner with the gear box 4 and conveys fuel to the injection nozzles 6. The fuel is conveyed from a non-illustrated fuel tank via a fuel pump to the injection pump 5. To alter the start and finish of an injection, or to alter the duration of injection of the injection nozzles 6, each cylinder unit 2 is provided with an electromagnetic control valve 7, each of which controls a non-illustrated discharge line. Also provided is a central regulator 8 which contains a non-illustrated electrically operating data processor which interacts with suitable, nonillustrated pick-up devices, and controls the electromagnetic control valves 7 via control pulses as a function of characteristic operating parameters of the internal combustion engine 1, for example temperature, speed, etc. Since the electromagnetic control valves, due to transmission errors caused by operation and wear, respond with delay to the control pulses generated by the electrical data processor, a delaying device is inventively provided within the central regulator 8 for each electromagnetic control valve 7. While taking into consideration the transmission characteristic of the control pulses of the data processor as they regard the control valves, the delaying device transmits to the respective electromagnetic control valve 7 in such a way that each valve 7 of each cylinder unit 2 opens and closes during each control procedure with a constant delay time of, for example, 2.56 ms. Since the constant time delay or lag of 2.56 ms corresponds to a different crank shaft angular range at changing speeds of the internal combustion engine 1, angular pulse pick-up elements 9 are disposed at 1° intervals on the flywheel 3. The pick-up elements 9 generate a series of pulses in a sensor 10. These pulses are a function of the actual speed of the internal combustion engine 1, and are used in a suitable circuit arrangement, which is also provided in the central regulator and which will be described in greater detail subsequently. This circuit arrangement establishes the constant time delay as a function of the actual speed of the internal combustion engine 1. The angular pulse pick-up element arrangement 9 includes a synchronous pulse pick-up element (not shown) which generates a synchronous pulse in the sensor 10. This synchronous pulse characterizes the start of the power stroke of the internal combustion engine 1, can be analyzed in a circuit arrangement of the central regulator 8, and is associated with the inner dead center position I (FIG. 6) of the first cylinder unit 2 of a power stroke of the internal combustion engine 1 as viewed in the ignition sequence.

Figure 2:
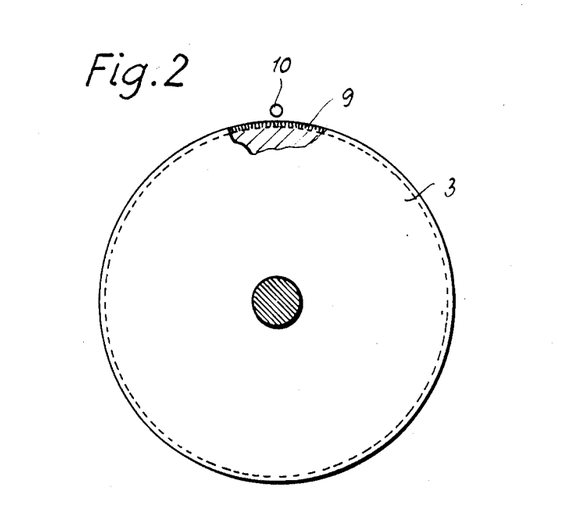
FIG. 2 is a cross-sectional view taken along the line II—II of FIG. 1.

In a sectional view taken along line II—II of FIG. 1, FIG. 2 clearly shows the angular pulse pick-up element arrangement 9 and the associated sensor 10 on the flywheel 3 of the internal combustion engine 1.

Figure 3:
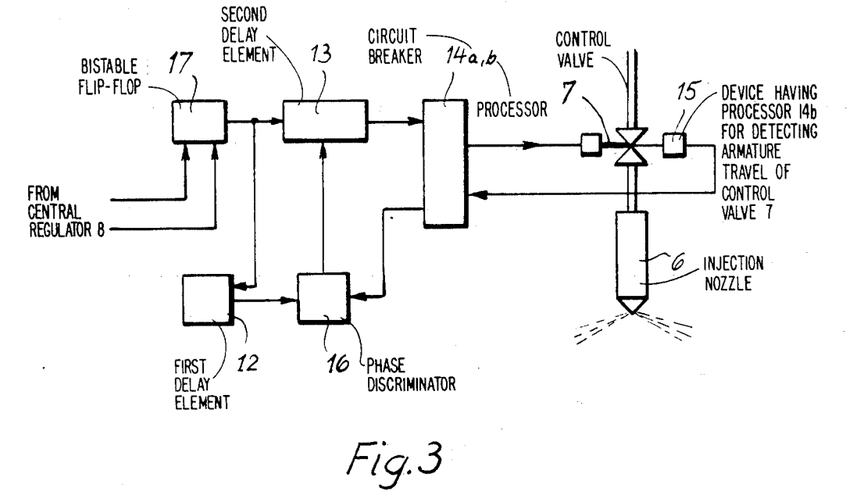
FIG. 3 is a circuit diagram of the invention delaying device for the electromagnetic control valves.

FIG. 3 illustrates an inventive delaying device of one of the electromagnetic control valves 7. The inventive delaying device is provided with a first delay element 12 having a constant time delay, preferably 2.56 ms; the delay device also includes a second delay element 13 having a variable time delay, a circuit breaker 14a, a device 15 having a processor 14b for detecting the armature travel of the control valve 7 and a phase discrimination 16. The device having the processor, for example, can comprise a permanent magnet, an induction coil, and the pole pieces associated therewith, and generates control signals in a known manner, for example as a result of the change of a magnetic resistance. The control pulse of the data processor, which pursuant to the circuit arrangement shown in FIG. 4 inventively is adapted as a function of speed to the constant time delay, is conveyed via a bistable flip-flop 17 on the one hand to the first delay element 12, and on the other hand to the second delay element 13. After a constant time delay of 2.56 ms, the delay element 12 delivers an output signal to the phase discriminator 16. The control pulse of the data processor is conveyed via the second delay element 13 and the circuit breaker 14a to the electromagnetic control valve 7. After a time delay associated with the valve, the control valve 7 reacts to the control pulse of the data processor, whereby the armature movement of the electromagnetic valve 7 generates an output signal in the device 15, which signal can be conveyed via the processor 14b as the actual value to the phase discriminator 16. The phase discriminator 16 will be further explained in conjunction with the description of FIG. 5. The phase discriminator 16 compares the actual value of the device 15 with the output signal of the first delay element 12 as the desired value. The phase discriminator 16 as a function of the desired value/actual value comparison, delivers a control value which regulates the second delay element 13 in such a way that the actual value of the electromagnetic control valve 7, and the output signal of the first delay element 12 are applied synchronous to the phase discriminator 16. Consequently, the control pulse of the data processor, while taking into consideration the transmission characteristic associated with the control valve, is transmitted to the electromagnetic control valve 7 with a constant time delay.

Figure 4:
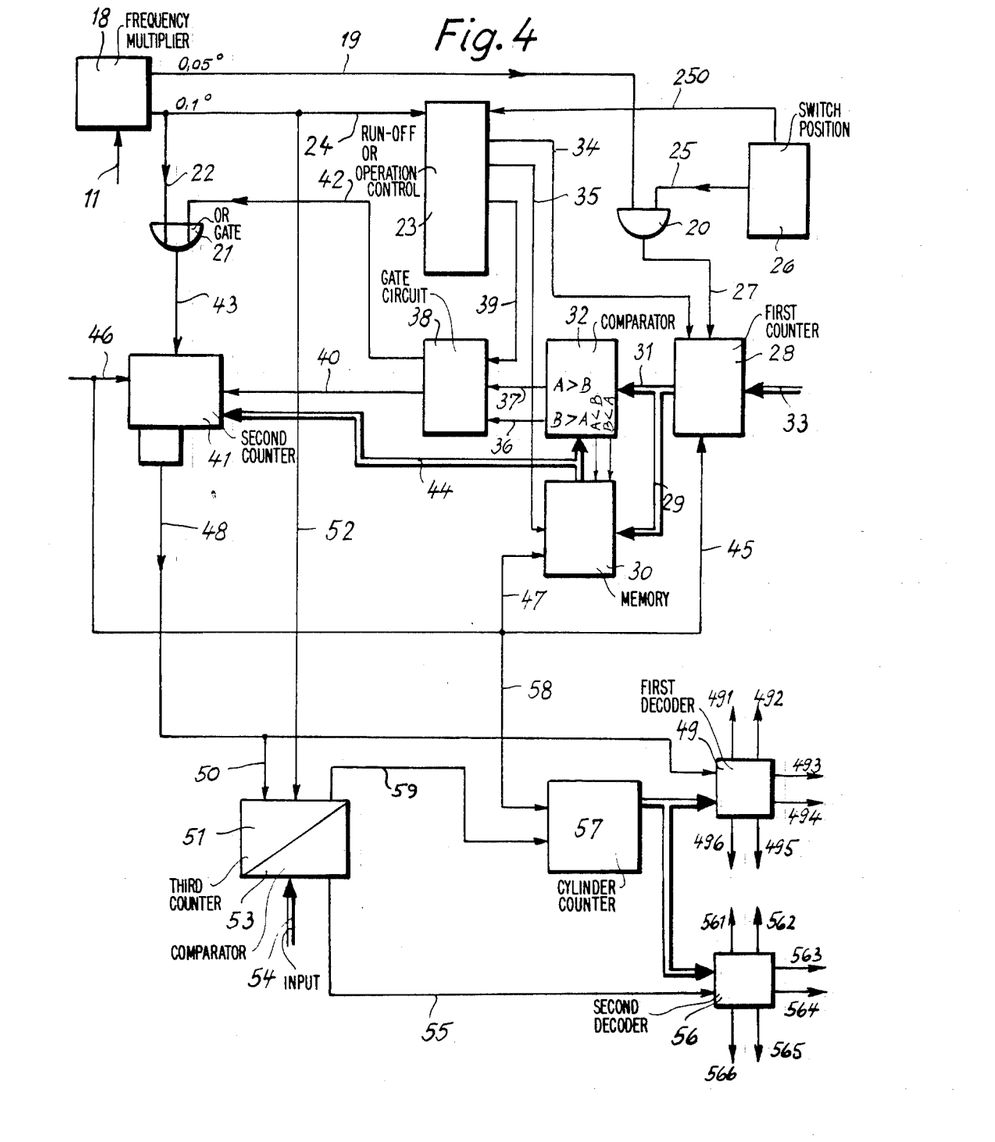
FIG. 4 is a circuit diagram for establishing the constant time delay as a function of the actual speed of the internal combustion engine, and for changing the control time point of the control valve as a function of the constant time delay.

FIG. 4 illustrates a circuit arrangement which establishes the constant time delay of the electromagnetic control valve 7 as a function of the actual speed of the internal combustion engine, and which, as a function of the constant time delay of the contol valve, alters the control time point determined by the electrically-operating data processor for opening and/or closing the control valve. The reference numeral 18 designates a frequency multiplier to which the series of pulses determined by the sensor 10 (FIG. 1) can be conveyed via the line 11. In the frequency multiplier 18, the series of pulses, on the one hand, can be multiplied 20 times, being conveyed as 0.05° crank shaft angular range pulses via a line 19 to an AND gate 20; the series of pulses, on the other hand, can be multiplied 10 times, being conveyed as 0.1° crank shaft angular range pulses to an OR gate 21 via a line 22, and to a run-off or operation control 23 via a line 24. The control 23 furthermore is connected via a line 250 with a switch position, switch step or working point 26. The AND gate 20 is controlled via a line 25 by the switch position 26, that is provided with a timer which is adjusted to the constant time delay of the first delay element 12 (FIG. 3) and to the varying frequency multiplication within the frequency multiplier 18. In the present example, in which the constant time delay is 2.56 ms, and the pulses conveyed to the AND gate 20 are multiplier 20 times, the timer is designed for the half constant time delay of 1.28 ms. The 0.05° crank shaft angular range pulses are conveyed via the AND gate 20 and via a line 27 to a first counter 28 which continuously determines the 0.05° pulses during the connection time of 1.28 ms. Connected with the output of the first counter 28 via a 10-bit data line 29, there is a memory 30, and via a further 10-bit data line 31, there is a comparator 32. Furthermore, desired values for changes in the beginning of injection, determined by the electrically-operating data procesor, are applied to the first counter 28 via an 8-bit input 33. An output 34 of the control 23, which is synchronized via the line 24 with 0.1° crank shaft angular range pulses from the frequency multiplier 18, is connected with the first counter 28, and via an output 35 with the memory 30. Associated with the comparator 32 via connections 36 and 37, there is a gate circuit 38 to which an input signal 39 of the control 23 also is applied. The output side of the gate circuit 38 is connected via a line 40 with a second counter 41, and via a line 42 with the OR gate 21. The second counter 41 is connected via the line 43 with the OR gate 21 and thus with the frequency multiplier 18, and is connected via a 10-bit date line 44 with the memory 30. The second counter 41 continuously determines 0.1° crank shaft angular pulse counting intervals which are limited by a fixed predeterminable maximum value. Furthermore, via lines 45, 46, and 47, the synchronous control signal, as generated in the sensor 10 by the synchronous marks on the flywheel 3, is applied to the input side of the first counter 28, the second counter 41, and the memory 30.

The 0.05° crank shaft angular pulses are counted during the connection time of 1.28 ms of the first counter 28 as determined by the switch position 26. Via the 8-bit data line 33, the desired value for the beginning of injection of the electrically-operating data processor 5 is set prior to each counting procedure in the first counter 28, and the count result determined during the duration of connection is added and the sum is stored in the memory 30. The measured value of the next following count, and the stored content, are compared in the comparator 32, and the content of the memory 30, as a function of the comparison results, is acted upon via the connection with the comparator 32 and the line 35, with an appropriate corrective pulse. Due to the very rapid counting rhythm, the comparison difference in the comparator is at most one crank shaft angular pulse. Via the operation control 23, the corrective pulse is placed in the gap between 20.1° crank shaft angular pulses. The correction via the comparator 32 and the gate circuit 38 is effected continuously. Furthermore, via the synchronous pulse generated in the sensor 10 and transmitted via the line 47, the memory 30 is set to the actual measured value of the counter 28. The second counter 41, parallel to the first counter 28, counts the 0.1° crank shaft angular pulses generated by the frequency multiplier 18 in continuous counting intervals which, with the present 6-cylinder internal combustion engine 1, are limited by the predetermined maximum value of 1.200 counting pulses in conformity with a 120° angular ignition range. If the synchronous pulse signal which characterizes the beginning of the power stroke of the internal combustion engine 1 is applied to the input 46 of the second counter 41, the content of the memory 30 is set via the 10-bit data line 44 into the second counter 41, so that the latter reaches the fixed predetermined value of 120° crank shaft angular range correspondingly sooner. During the power stroke of the internal combustion engine 1, the corrective pulses which characterize the changes of the actual speed of the internal combustion engine 1 also are conveyed via the gate circuit 38 and the OR gate 21 to the second counter 41, with the operation control 23 assuring that this corrective pulse is applied in the gap between 20.1° crank shaft angular pulses. Via the line 40, the counter 41 is informed whether the respective corrective pulse is to be added to the counter reading, or is to be subtracted therefrom. When the fixed predetermined maximum value of each time interval has been reached, the second counter 41 generates a control pulse which is conveyed to a decoder 49 for beginning of injection. The decoder 49 transmits the pulse or for beginning of injection to the bistable flip-flops 17 of the individual delaying elements of the electromagnetic control valves 7 of the cylinder units 2 via outputs 491, 492, 493, 494, 495, and 496.

A third counter 51 is connected with the output 48 of the second counter 41 via a line 50, and with the output 24 of the frequency multiplier 18 via a line 52, so that the third counter 51 also counts the 0.1° crank shaft angular pulses generated by the frequency multiplier 18. Provided at the third counter 51, there is a digital comparator 53 which is connected with the electrical data processor via an 8-bit input 54. When the magnitude at the third counter 51 reaches the actual value for the duration of injection as input into the comparator 53, the latter generates a control pulse for ending the injection. This control pulse is conveyed via an output 55 to a second decoder 56, which triggers the flip-flops 17 of the individual delaying devices of the respective electromagnetic control valve 7 of the cylinder units 2 via lines 561, 562, 563, 564, 565, and 566 for closing the valves 7. The decoder 49 for beginning of injection, and the decoder 56 for the end of injection, are triggered by a cylinder counter 57, which is synchronized, via an input 58, by the synchronous pulse generated in the sensor 10 (FIG. 1). The cylinder counter 57 is connected via a line 59 with the third counter 51, and is advanced after the control pulse of the comparator 53 by an appropriate switching pulse.

Figure 5A:
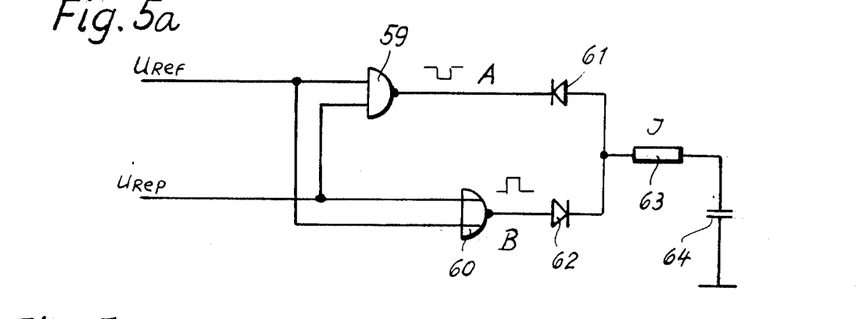
FIGS. 5a–5e are control diagrams of the phase discriminator of the delaying device, and timing diagrams of the phase discriminator.
Figure 5B:
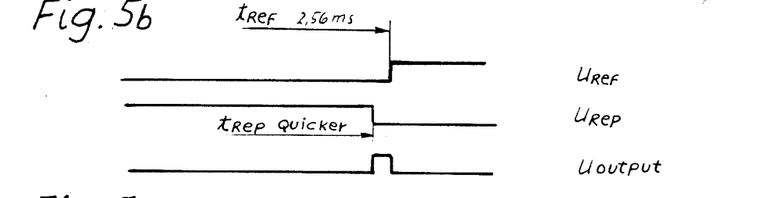
Figure 5C:
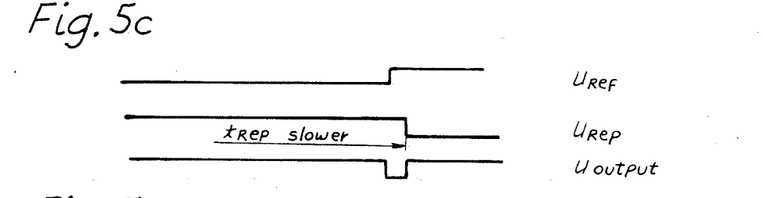
Figure 5D:
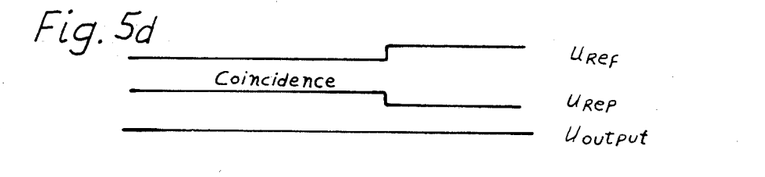
Figure 5E:
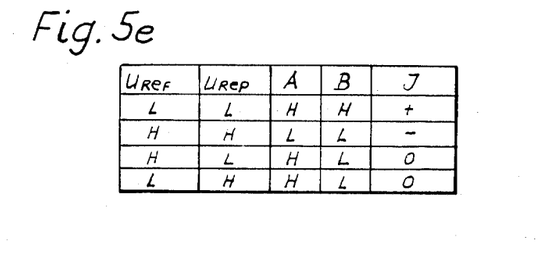

The phase discriminator 16 (FIG. 3) of the individual delaying devices of the control valves 7 is illustrated in greater detail in FIG. 5a. The control signals $U_{Ref}$ transmitted from the first delay element 12, and the repeating or reply signals $U_{Rep}$ generated via the device 15 for recognizing the armature travel of the electromagnetic control valve 7, are respectively applied to the input sides of an NAND gate 59 and an NOR gate 60. Due to the positive sides of $U_{Ref}$, and the negative sides of $U_{Rep}$, "High-impulses" are formed at the outputs A and B when the reply signal arrives prior to completion of the constant time delay (in the present case, 2.56 ms); "Low-impulses" are formed when the reply signal arrives after completion of the constant time delay. Due to the time difference of the two input signals, the time width of the pulses is affected. Via rectifiers 61 and 62 and a resistor 63, the pulses are conveyed to a capacitor 64, which forms a charging voltage in conformity with the direction ("high" or "low") and the pulse width (time duration). This charging voltage, as a control parameter, regulates the second delay element 13 with the variable time delay.

Figure 6:
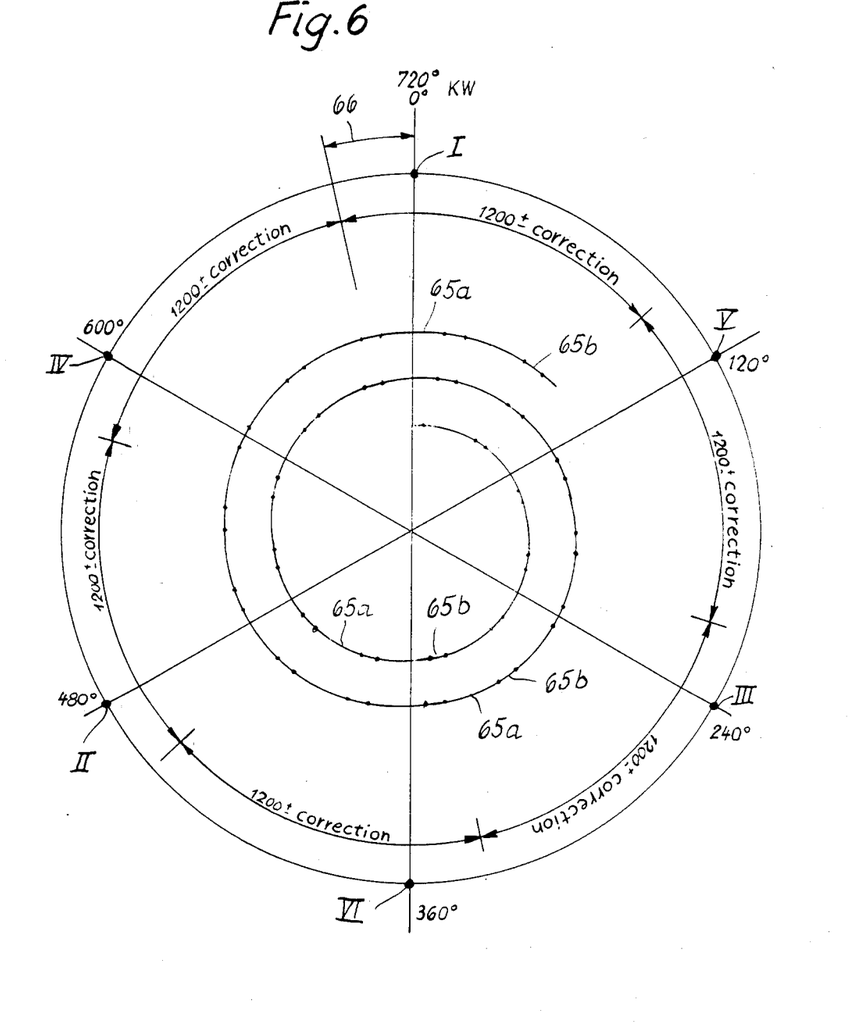
FIG. 6 is a progress diagram of the inventive fuel injection system during one power stroke for a 6-cylinder, 4-stroke, internal combustion engine.

FIG. 6 is a progress diagram of a power stroke of the internal combustion engine 1; I through VI inclusive indicate the inner dead center position of the cylinder units 2 in the ignition sequence 1-5-3-6-2-4 as a function of the crank shaft angle; the cylinder units 2 have a respective ignition interval of 120° crank shaft angle. On the inner spiral of the progress diagram, schematically indicated by 65a are the 1.28 ms connection times of the first counter 28 for determining the 0.05° crank shaft angular pulse, and by 65b the time intervals in which the memory 30 and the second counter 41 are corrected via the comparator 32 and the gate circuit 38 in conformity with the actual speed of the interval combustion engine 1 as determined by the first counter 28; the corrective pulses are placed by the operation control 23 into the gaps of two successive 0.1° crank shaft angular pulses. In conformity with the ignition interval, the counter intervals of the maximum value which limits the second counter 41 is set at 1200. 66 indicates the crank shaft angular range which at a predetermined actual speed of the internal combustion engine corresponds to the constant time delay of the delaying device of 2.56 ms, which is determined by the first counter 28, and which can be set in the second counter 41 via the synchronous pulse. Also taken into consideration in this connection is a desired value for the beginning of ignition; this desired value is determined by the electrical data processor. Thus, when the maximum value of the second counter is reached, desired value triggers the control pulse for beginning of injection. Accordingly, the electromagnetic control valve 7 is opened precisely, whereby changes of the actual speed of the internal combustion engine 1 during the power stroke thereof are taken into account by a positive or negative correction produced via the corrective pulse.

The present invention, of course, in no way restricted to the specific disclosure of the specification and drawings, but also encompasses any modifications within the scope of the appended claims.

What we claim is:

1. A fuel injection system for an air-compressing, spontaneous-ignition, reciprocating piston internal combustion engine which is provided with a fuel injection pump and an injection nozzle respectively for each cylinder unit, each of which is provided on a high pressure side of the fuel injection pump with at least one electromagnetic control valve for regulating at least one parameter which characterizes the injection process; each control valve is adapted to be controlled from an electrically operating data processor by means of a control pulse as a function of characteristic operating parameters of said internal combustion engine; the improvement comprises:

a delaying device for and associated with each of said electromagnetic control valves; each delaying device, while taking into account the transmission characteristics of its control valve, transmits said control pulse of said data processor to said control valve in such a way that the latter opens and/or closes with a constant time delay during each control procedure; this constant time delay of said control valve is adapted to be established as a function of the actual speed of said internal combustion engine; the control time point of said control valve, as determined by said data processor, for opening and/or closing said control valve, is adapted to be varied as a function of said constant time delay; each delaying device comprising:

a first delay element having a constant time delay as a reference time for said control valve;

a second delay element having a variable time delay for said control valve;

a circuit breaker;

a device, which is provided with a processor, for detecting the armature travel of said control valve;

a phase discriminator; and said control pulse of said data processor can be conveyed to said first and said second delay elements; in which said control valve can be controlled by said second delay element; and in which said device for detecting the armature travel of said control valve delivers an actual value to said phase discriminator, and said first delay element delivers a desired value to said phase discriminator, which, as a function of the desired value/actual value comparison, generates a control value for regulating said second delay element such that summation of adjusted delay time of said second delay element and response time of said control valve corresponds to the constant time delay of said first delay element.

2. A fuel injection system for an air-compressing, spontaneous-ignition, reciprocating piston internal combustion engine which is provided with a fuel injection pump and an injection nozzle for each cylinder unit, each of which is provided with at least one electromagnetic control valve for regulating at least one parameter which characterizes the injection process; each control valve is adapted to be controlled from an electrically operating data processor by means of a control pulse as a function of characteristic operating parameters of said internal combustion engine; the improvement comprises:

a delaying device for and associated with each of said electromagnetic control valves; each delaying device, while taking into account the transmission characteristics of its control valve, transmits said control pulse of said data processor to said control valve in such a way that the latter opens and/or closes with a constant time delay during each control procedure; this constant time delay of said control valve is adapted to be established as a function of the actual speed of said internal combustion engine; the control time point of said control valve, as determined by said data processor, for opening and/or closing said control valve, is adapted to be varied as a function of said constant time delay;

each delaying device comprising:

a first delay element having a constant time delay;

a second delay element having a variable time delay;

a circuit breaker;

a device, which is provided with a processor, for detecting the armature travel of said control valve; and a phase discriminator;

a first and a second counter, and a sensor; and in which a component of said internal combustion engine directly dependent upon the actual speed of the latter being provided with pick-up elements which generate in said sensor a series of pulses which are a function of the actual speed of said internal combustion engine; said last-mentioned pulses can be conveyed to said first and second counters;

wherein said pulses generated in said sensor can be conveyed to said first and second counters via a frequency multiplier;

a switch position for switching said first counter on and off;

a timer for controlling said switch position as a function of said constant time delay of said first delay element;

said first and second counters being connectible to one another;

a memory, with the process variable determined by said first counter being adapted to be stored in said memory;

said first counter being adapted to be set to a desired value, for the initiation of injection, as determined by said data processor; said last-mentioned desired value, and the process variable determined by said first counter, being added together to form a total which can be conveyed to said memory;

said second counter continuously determines counting intervals which are limited by a fixed predetermined maximum value;

said pick-up elements including a synchronous pulse pick-up element for generating in said sensor a synchronous pulse which characterizes the beginning of the power stroke of said internal combustion engine;

said second counter being connectible to said memory, and also capable of being set to the content thereof via said synchronous pulse;

said fixed predetermined maximum value of said counting intervals of said second counter being correlated to the ignition period of that cylinder unit of said internal combustion engine which in the ignition sequence follows said synchronous pulse;

a comparator which compares the content of said memory with each process variable deterned by said first counter, and which, as a function of the results of said comparison, corrects the memory content and said counter, with correction being effected between two counting pulses of said second counter;

said switch position being controlled by said timer at half of said constant time delay of said first delay element, with said control pulses for said first counter being multiplied twenty times by said frequency multiplier, and said control pulses for said second counter being multiplied ten times.

3. A fuel injection system according to claim 1, in which said constant time delay of said first delay element is 2.56 ms.

4. A fuel injection system according to claim 2, in which said control pulse of said data processor can be conveyed to said first and said second delay elements; in which said control valve can be controlled by said second delay element; and in which said device for detecting the armature travel of said control valve delivers an actual value to said phase discriminator, and said first delay element delivers a desired value to said phase discriminator, which, as a function of the desired value-/actual value comparison, generates a control valve for regulating said second delay element.

5. A fuel injection system accoding to claim 4, in which said phase discriminator generates such a control value that a coincident desired value and actual value exist at said phase discriminator.

6. A fuel injection system according to claim 1, which includes a first and a second counter, and a sensor; and in which a component of said internal combustion engine which is directly dependent upon the actual speed of the latter is provided with pick-up elements which generate in said sensor a series of pulses which are a function of the actual speed of said internal combustion engine; said last-mentioned pulses can be conveyed to said first and second counters.

7. A fuel injection system according to claim 6, in which said component of said internal combustion engine which is directly dependent upon the actual speed thereof is one of said crank shaft and said flywheel of said engine.

8. A fuel injection system according to claim 7, in which said pick-up elements are disposed on said component at 1° intervals.

9. A fuel injection system according to claim 6, in which said pulses generated in said sensor can be converted in said first and second counters into a process variable which characterizes the actual speed of said internal combustion engine.

10. A fuel injection system according to claim 6, in which said pulses generated in said sensor can be conveyed to said first and second counters via a frequency multiplier.

11. A fuel injection system according to claim 10, which includes a switch position for switching said first counter on and off.

12. A fuel injection system according to claim 11, which includes a timer for controlling said switch position as a function of said constant time delay of said first delay element.

13. A fuel injection system according to claim 12, in which said first and second counters can be connected to one another.

14. A fuel injection system according to claim 13, which includes a memory, with the process variable determined by said first counter being adapted to be stored in said memory.

15. A fuel injection system according to claim 14, in which said first counter is adapted to be set to a desired value, for the initiation of injection, as determined by said data processor; said last-mentioned desired value, and the process variable determined by said first counter, are added together to form a total which can be conveyed to said memory.

16. A fuel injection system according to claim 15, in which said second counter continuously determines counting intervals which are limited by a fixed predetermined maximum value.

17. A fuel injection system according to claim 16, in which said pick-up elements incude a synchronous pulse pick-up element for generating in said sensor a synchronous pulse which characterizes the beginning of the power stroke of said internal combustion engine.

18. A fuel injection system according to claim 17, in which said second counter can be connected to said memory, and can be set to the content thereof via said synchronous pulse.

19. A fuel injection system according to claim 18, in which said fixed predetermined maximum value of said counting intervals of said second counter are correlated to the ignition period of that cylinder unit of said internal combustion engine which in the ignition sequence follows said synchronous pulse.

20. A fuel injection system according to claim 19, which includes a comparator which compares the content of said memory with each process variable determined by said first counter, and which, as a function of the results of said comparison, corrects the memory content and said second counter, with correction being effected between two counting pulses of said second counter.

21. A fuel injection system according to claim 2, in which, when said second counter reaches said fixed predetermined maximum value of each counting interval, it generates a control pulse for initiation of injection, said control pulse being adapted to be conveyed to said first and second delay elements.

22. A fuel injection system according to claim 21, which includes a third counter to which can be applied the output signal of said frequency multiplier for said second counter.

23. A fuel injection system according to claim 22, in which said third counter is adapted to be actuated by the control pulse of said second counter generated when said maximum value is reached.

24. A fuel injection system according to claim 23, which includes a second comparator, which can be set to a desired value, for duration of injection, as determined by said data processor, and which can be connected with said third counter when the latter is actuated; when the counting value determined by said third counter, and said desired value for duration of injection, are reached, said second comparator generates a control pulse for termination of injection, said last-mentioned control pulse being adapted to be conveyed to said first and second delay elements.

* * * * *